United States Patent
Stasiak et al.

(10) Patent No.: US 10,315,168 B2
(45) Date of Patent: *Jun. 11, 2019

(54) HYDROPHILIC POROUS POLYTETRAFLUOROETHYLENE MEMBRANE (II)

(71) Applicant: PALL CORPORATION, Port Washington, NY (US)

(72) Inventors: Marcin Stasiak, Port Washington, NY (US); Hassan Ait-Haddou, Melville, NY (US); Frank O. Onyemauwa, Pace, FL (US); Amarnauth Singh, Seldon, NY (US)

(73) Assignee: Pall Corporation, Port Washington, NY (US)

( * ) Notice: Subject to any disclaimer, the term of this patent is extended or adjusted under 35 U.S.C. 154(b) by 724 days.

This patent is subject to a terminal disclaimer.

(21) Appl. No.: 14/815,578

(22) Filed: Jul. 31, 2015

(65) Prior Publication Data
US 2017/0028362 A1    Feb. 2, 2017

(51) Int. Cl.
*B01D 67/00* (2006.01)
*B01D 71/36* (2006.01)
(Continued)

(52) U.S. Cl.
CPC ......... *B01D 71/36* (2013.01); *B01D 67/0027* (2013.01); *B01D 67/0083* (2013.01);
(Continued)

(58) Field of Classification Search
None
See application file for complete search history.

(56) References Cited

U.S. PATENT DOCUMENTS

| 4,136,237 A | 1/1979 | Takahashi et al. |
| 4,975,507 A | 12/1990 | Asrar |
| | (Continued) | |

FOREIGN PATENT DOCUMENTS

| CN | 101108313 A | * | 1/2008 |
| CN | 103709388 A | * | 4/2014 |
| | (Continued) | | |

OTHER PUBLICATIONS

Machine translation CN-101108313-A.*
(Continued)

*Primary Examiner* — Heidi R Kelley
*Assistant Examiner* — Eric J McCullough
(74) *Attorney, Agent, or Firm* — Leydig, Voit & Mayer, Ltd.

(57) ABSTRACT

Disclosed are hydrophilic porous PTFE membranes comprising PTFE and an amphiphilic copolymer of the formula (I):

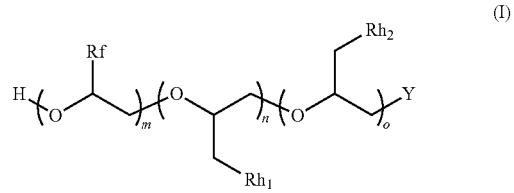

wherein Rf, $Rh_1$, $Rh_2$, Y, m, n, and o are as described herein. Also disclosed are a method of preparing hydrophilic porous PTFE membranes and a method of filtering fluids through such membranes.

10 Claims, 2 Drawing Sheets

(51) Int. Cl.
*B01D 71/52* (2006.01)
*B01D 71/76* (2006.01)

(52) U.S. Cl.
CPC ......... *B01D 67/0093* (2013.01); *B01D 71/52* (2013.01); *B01D 71/76* (2013.01); *B01D 2323/02* (2013.01); *B01D 2325/36* (2013.01)

(56) References Cited

U.S. PATENT DOCUMENTS

| | | |
|---|---|---|
| 5,117,327 A | 5/1992 | Asrar et al. |
| 5,200,470 A | 4/1993 | Asrar |
| 5,219,662 A | 6/1993 | Grimminger et al. |
| 5,294,493 A | 3/1994 | Beckerbauer et al. |
| 5,418,277 A | 5/1995 | Ma et al. |
| 6,080,826 A | 6/2000 | Grubbs et al. |
| 6,303,725 B1 | 10/2001 | Chang et al. |
| 6,313,222 B1 | 11/2001 | Lin et al. |
| 6,436,476 B1 | 8/2002 | Sage, Jr. |
| 6,492,443 B1 | 12/2002 | Kodemura et al. |
| 6,653,424 B1 | 11/2003 | Sakamoto et al. |
| 6,677,418 B1 | 1/2004 | Feast et al. |
| 6,987,154 B2 | 1/2006 | Choi et al. |
| 7,232,917 B2 | 6/2007 | Sumida et al. |
| 7,514,499 B2 | 4/2009 | Tam et al. |
| 8,143,369 B2 | 3/2012 | Fujiwara et al. |
| 8,223,472 B1 | 7/2012 | Dirk et al. |
| 8,283,410 B2 | 10/2012 | Musa |
| 8,410,290 B2 | 4/2013 | Fujiwara et al. |
| 8,431,625 B2 | 4/2013 | Luchterhandt et al. |
| 8,678,203 B2 | 3/2014 | Knapp et al. |
| 8,883,925 B2 | 11/2014 | Kizu et al. |
| 2008/0234451 A1 | 9/2008 | Kenwright et al. |
| 2009/0023877 A1 | 1/2009 | Liaw et al. |
| 2009/0030175 A1 | 1/2009 | Yamamoto et al. |
| 2009/0043059 A1 | 2/2009 | Liaw et al. |
| 2009/0182117 A1 | 7/2009 | Takeyama et al. |
| 2009/0264608 A1 | 10/2009 | Wakatsuki et al. |
| 2009/0269601 A1 | 10/2009 | Ishiguro et al. |
| 2009/0275719 A1 | 11/2009 | Ishiguro et al. |
| 2011/0073541 A1 | 3/2011 | Ishizuka et al. |
| 2011/0266220 A1 | 11/2011 | Campos et al. |
| 2012/0041137 A1 | 2/2012 | Musa et al. |
| 2012/0214940 A1 | 8/2012 | Hsu et al. |
| 2012/0245271 A1 | 9/2012 | Pawlow et al. |
| 2013/0281644 A1 | 10/2013 | Kiessling et al. |
| 2013/0292872 A1 | 11/2013 | Knapp et al. |
| 2014/0357820 A1 | 12/2014 | Stephen et al. |

FOREIGN PATENT DOCUMENTS

| | | | | |
|---|---|---|---|---|
| CN | 103772692 A | | 5/2014 | |
| EP | 2767330 A2 | | 8/2014 | |
| EP | 3088071 A1 | | 11/2016 | |
| FR | 2697256 B1 | * | 12/1994 | ......... C08G 18/5015 |
| JP | H1-104061 A | | 4/1989 | |
| JP | H8-003405 A | | 1/1996 | |
| JP | 2000-512902 T | | 10/2000 | |
| JP | 2003-246906 A | | 9/2003 | |
| JP | 2004-535485 T | | 11/2004 | |
| JP | 2009-120775 A | | 6/2009 | |
| JP | 2012-000571 A | | 1/2012 | |
| KR | 10-2012-0124537 A | | 11/2012 | |
| TW | 201041955 A | | 12/2010 | |
| WO | WO 93/15255 | | 8/1993 | |
| WO | WO-9410222 A1 | * | 5/1994 | ......... C08G 18/5015 |
| WO | WO 2007/105653 A1 | | 9/2007 | |

OTHER PUBLICATIONS

Machine translation CN-103709388-A.*
Machine translation WO-9410222-A1.*
English Machine Translation of FR2697256B1.*
Japan Patent Office, Final Rejection issued in Japanese Application No. 2016-119785, (dated Dec. 19, 2017) 4 pp.
Taiwanese Intellectual Property Office, Examination and Search Report issued in Taiwanese Application No. 105120504, (dated May 8, 2017) 6 pp.
Intellectual Property Office of Singapore, Search Report issued in Singapore Application No. 10201604946U, 2 pp. (dated Aug. 17, 2016).
European Patent Office, Extended European Search Report issued in European Application No. 16175311.6, (dated Sep. 16, 2016) 6 pp.
Cui et al., "Recent progress in fluoropolymers for membranes", *Progress in Polymer Science*, vol. 39, No. 1, pp. 164-198 (2014).
Japan Patent Office, Notice of Reasons for Rejection issued in Japanese Application No. 2016-119785, (dated Sep. 5, 2017) 6 pp.
Korean Intellectual Property Office, 2nd Notice of Non-Final Rejection issued in Korean Application No. 10-2016-0081137 (dated Oct. 23, 2017).
Korean Intellectual Property Office, Notice of Non-Final Rejection issued in Korean Application No. 10-2016-0081137, (dated Apr. 25, 2017) 7 pp.
Intellectual Property Office of Singapore, Written Opinion issued in Singapore Application No. 10201604946U (dated Jun. 8, 2018).
Korean Intellectual Property Office, 3rd Notice of Non-Final Rejection issued in Korean Application No. 10-2016-0081137 (dated Apr. 24, 2018).
European Patent Office, Examination Report issued in European Application No. 16175311.6 (dated Feb. 5, 2019).

* cited by examiner

HYDROPHILIC POROUS POLYTETRAFLUOROETHYLENE MEMBRANE (II)

BACKGROUND OF THE INVENTION

The properties of porous PTFE membrane, including its mechanical strength, chemical resistance or inertness, non-adhesiveness, excellent dielectric property, thermal stability at high temperature and low coefficient of friction make it very attractive for various applications. However, for certain applications, it will be beneficial to improve its wetting characteristics without affecting its intrinsic properties. Efforts have been made to modify one or more properties of PTFE membranes. However, many of these efforts result in reduction in one or more of PTFE's attractive properties, for example, mechanical strength.

The foregoing shows that there exists an unmet need for preparing porous PTFE membranes with improved wetting characteristics without significantly affecting its mechanical strength.

BRIEF SUMMARY OF THE INVENTION

The present invention provides a hydrophilic porous membrane comprising polytetrafluoroethylene (PTFE) and an amphiphilic copolymer of formula (I):

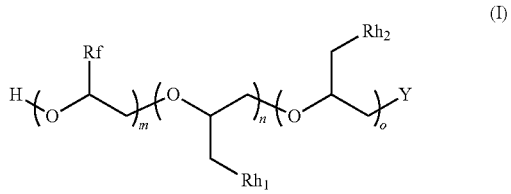

wherein the amphiphilic copolymer is a random or block copolymer, Rf is a perfluoro-substituted group, whereas $Rh_1$ and $Rh_2$ are hydrophilic groups or chlorine, m, n, and o are independently from 0 to 1000, provided m+n+o is greater than or equal to 10, and Y is hydroxyl.

The invention further provides a method of preparing a hydrophilic porous PTFE membrane comprising:

(i) preparing a blend comprising PTFE and a amphiphilic copolymer, and optionally a lubricant;
(ii) extruding the blend into a tape;
(iii) biaxially stretching the tape to obtain a hydrophilic porous membrane; optionally
(iv) reacting the hydrophilic porous membrane with an agent to modify the chemical structure of the amphiphilic copolymer; and optionally
(v) annealing the hydrophilic porous membrane;
wherein the amphiphilic copolymer is of formula (I):

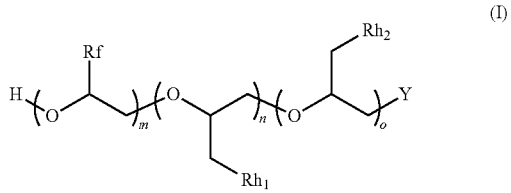

wherein the amphiphilic copolymer is a homopolymer or a random or block copolymer, Rf is a perfluoro-substituted group, whereas $Rh_1$ and $Rh_2$ are hydrophilic groups or chlorine, m, n and o are independently from 0 to 1000, provided m+n+o is greater than or equal to 10, and Y is hydroxyl.

The hydrophilic porous membranes share many of the advantages of PTFE membranes, for example, mechanical strength, and at the same time, exhibit high levels of water wettability.

The invention further provides methods of filtering fluids through these hydrophilic porous PTFE membranes.

BRIEF DESCRIPTION OF THE SEVERAL VIEWS OF THE DRAWING(S)

DETAILED DESCRIPTION OF THE INVENTION

Figure 1:
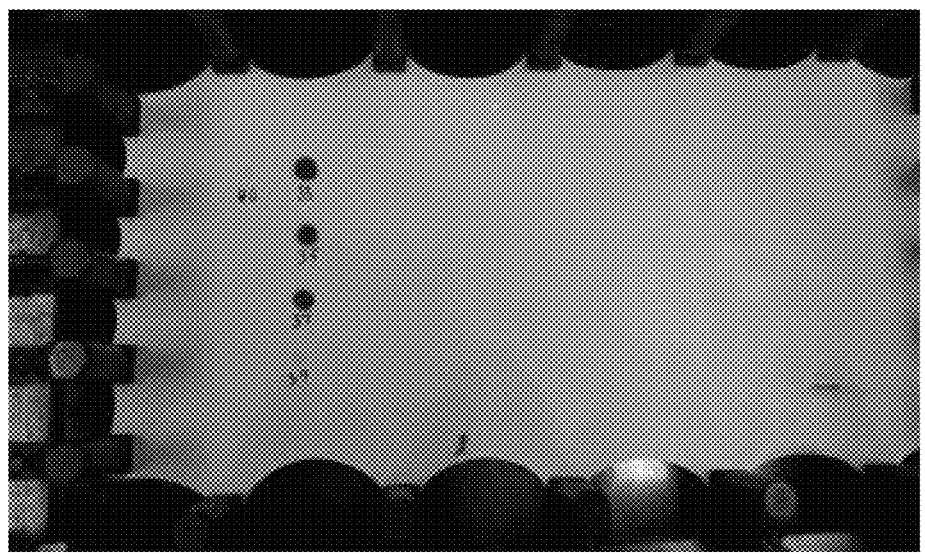
FIG. 1 depicts an optical micrograph of the surface of a hydrophilic PTFE membrane annealed at 150° C.
Figure 2:
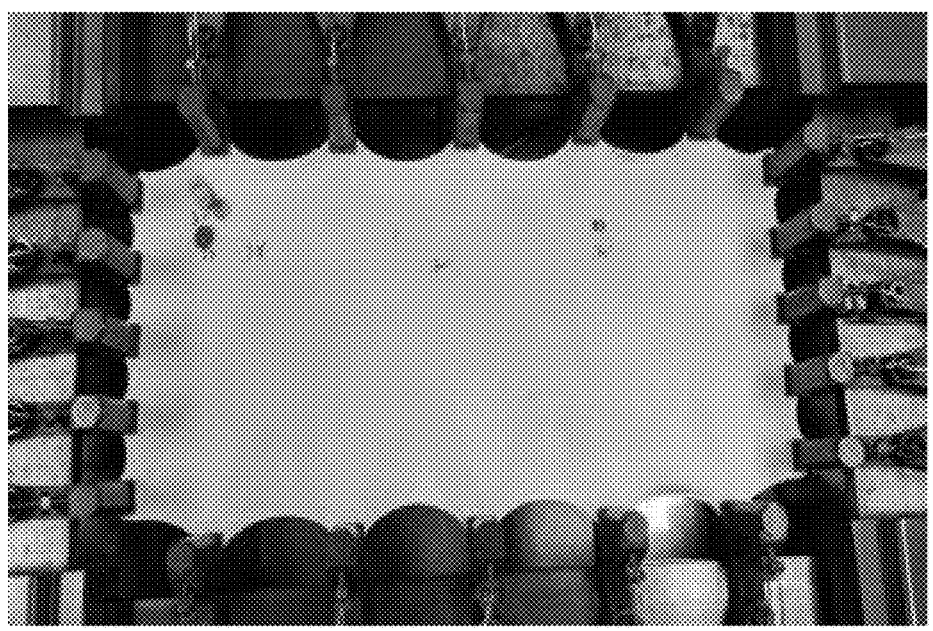
FIG. 2 depicts an optical micrograph of the surface of a hydrophilic PTFE membrane annealed at 250° C.
Figure 3:
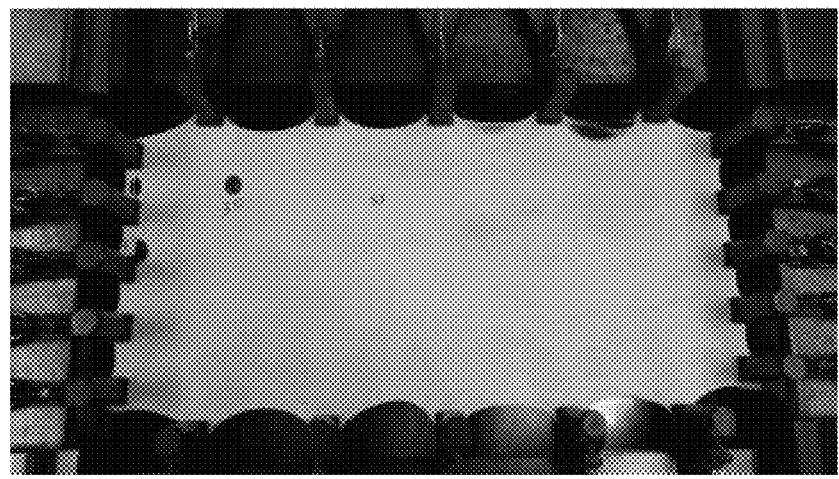
FIG. 3 depicts an optical micrograph of the surface of a hydrophilic PTFE membrane annealed at 350° C.

In accordance with an embodiment, the invention provides a hydrophilic porous membrane comprising polytetrafluoroethylene (PTFE) and an amphiphilic copolymer of formula (I):

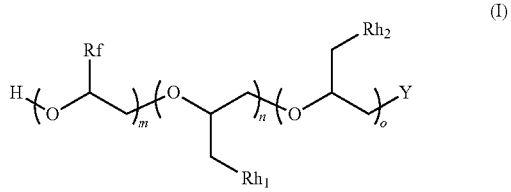

wherein the amphiphilic copolymer is a random or block copolymer, Rf is a perfluoro-substituted group, whereas $Rh_1$ and $Rh_2$ are hydrophilic groups or chlorine, m and n are independently from 0 to 1000, provided m+n+o is greater than or equal to 10, and Y is hydroxyl.

In embodiments, m, n and o represent the degrees of polymerization of the respective monomers, and are each independently from about 10 to about 1000 or more, preferably from about 100 to about 200.

In other embodiments, m, n and o represent the mole fraction of the monomers present in the copolymer and each can independently range between 0 to 99 mole %, preferably 10 to 40 mole %.

The respective monomer blocks can be present in the block copolymer in any suitable mass %, for example, in an embodiment, from about 99%: about 1% to about 50%: about 50%, preferably from about 90%: about 10% to about 70%: about 30%, and more preferably from about 75%: about 25%.

The copolymer can be of any suitable molecular weight, for example, in an embodiment, a number or weight (Mn or Mw) average molecular weight from about 10 kDa to about 1000 kDa, preferably from about 75 kDa to about 500 kDa, and more preferably from about 250 kDa to about 500 kDa.

The amphiphilic copolymers of the invention can be prepared by any suitable method, for example, by ring opening polymerization of a fluorinated epoxy compound. See for example, US 2009/0030175 A1. The ring opening polymerization is conducted in the presence of a trialkyl aluminum and a salt having an organic counter cation, as illustrated below on a mixture of two monomers: perfluoroalkyl epoxide and t-butyl glycidyl ether (TGBE). The resulting diblock copolymer is reacted with an acid such as trifluoroacetic acid to remove the t-butyl group and provide a copolymer of perfluorinated ethylene oxide and hydroxymethyl ethylene oxide:

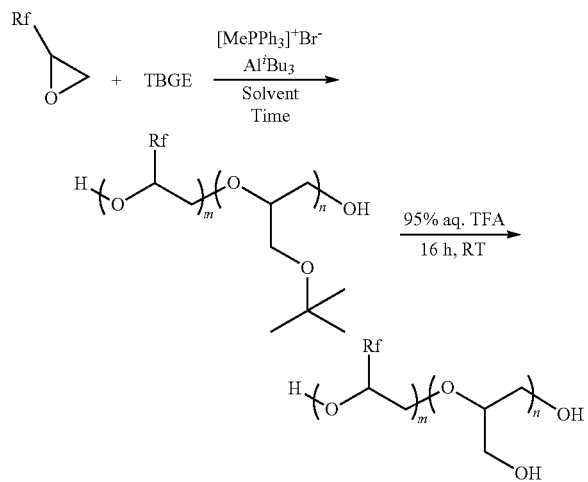

In an embodiment, to prepare a triblock copolymer, a diblock copolymer such as the diblock block copolymer obtained from the perfluorinated ethylene oxide and TGBE is first prepared, and a third monomer can be added and the polymerization continued.

The polymerization of the monomers is conducted in a suitable solvent, for example, a fluorinated solvent. The solvent can be selected based on the appropriate solubility of the fluorinated polymer to be formed. An example of a suitable solvent is hexafluorobenzene. Examples of suitable solvents include aromatic hydrocarbons such as benzene, toluene, and xylene, aliphatic hydrocarbons such as n-pentane, hexane, and heptane, alicyclic hydrocarbons such as cyclohexane, and halogenated hydrocarbons such as dichloromethane, dichloroethane, dichloroethylene, tetrachloroethane, chlorobenzene, dichlorobenzene, and trichlorobenzene, as well as mixtures thereof.

The monomer concentration can be in the range of 1 to 50 wt %, preferably 2 to 45 wt %, and more preferably 3 to 40 wt %.

The polymerization can be carried out at any suitable temperature, for example, from 0 to 150° C., preferably 0 to 80° C.

To prepare a block copolymer, for example, the polymerization can be carried out for any time suitable to obtain the appropriate chain length of each of the blocks, which can be from about 1 minute to 100 hours.

The amount of catalyst can be chosen in any suitable amount. For example, the molar ratio of the catalyst to a monomer can be about 1:10 to about 1:1000, preferably about 1:50 to 1:500, and more preferably about 1:100 to about 1:200. For example, the molar ratio of the catalyst to a monomer could be 1:n, 1:m, or 1:o, where n, m, and o are the average degrees of polymerization.

The polymers can be isolated by a suitable technique, for example, precipitation with a nonsolvent.

The copolymers can be characterized for their molecular weights and molecular weight distributions by any known techniques. For example, a MALS-GPC technique can be employed. The technique uses a mobile phase to elute, via a high pressure pump, a polymer solution through a bank of columns packed with a stationary phase. The stationary phase separates the polymer sample according to the chain size followed by detecting the polymer by three different detectors. A series of detectors can be employed, e.g., an Ultraviolet detector (UV-detector), followed by a multi-angle laser light scattering detector (MALS-detector), which in turn, is followed by a refractive index detector (RI-detector) in a row. The UV-detector measures the polymer light absorption at 254 nm wavelength; the MALS-detector measures the scattered light from polymer chains relative to mobile phase.

The polydispersity of the copolymers depends on the reaction conditions. For example, the copolymers have an Mw/Mn of 1.05 to 2.5, preferably 1.1 to 1.2.

Examples of amphiphilic copolymers, their structures, and representative formulations for forming hydrophilically modified PTFE membranes are set forth in Table 1.

TABLE 1

Examples of amphiphilic copolymers and formulations

| Batch MS-06- | Acronym | Structure | Formulation |
|---|---|---|---|
| 9 | pPF8PO-r-pTBGE | C$_8$F$_{17}$ ... (structure with subscripts 100, 200) | 25 wt % 25 wt % of Acetone 50 wt % of Isopar G |

TABLE 1-continued

Examples of amphiphilic copolymers and formulations

| Batch MS-06- | Acronym | Structure | Formulation |
|---|---|---|---|
| 36 | pPF6EtGE | $C_6F_{13}$-...-$H[O-]_{100}OH$ | 25 wt % <br> 25 wt % of AK-225 <br> 50 wt % of Isopar G |
| 37 | pPF6EtGE-r-pECH | $C_6F_{13}$-...-$H[O-]_{100}[O-]_{200}OH$, Cl | 25 wt % <br> 25 wt % of Acetone <br> 50 wt % of Isopar G |
| 38-FIN | pPF8PO-r-Pg | $C_8F_{17}$-...-$H[O-]_{100}[O-]_{200}OH$, OH | 25 wt % <br> 25 wt % of Acetone <br> 50 wt % of Isopar G |

The present invention further provides a method of preparing a hydrophilic porous PTFE membrane comprising:

(i) preparing a blend comprising PTFE and an amphiphilic copolymer, and optionally a lubricant;

(ii) extruding the blend into a tape;

(iii) biaxially stretching the tape to obtain a hydrophilic porous membrane; optionally (iv) reacting the hydrophilic porous membrane with an agent to modify the chemical structure of the amphiphilic copolymer; and optionally (v) annealing the hydrophilic porous membrane;

wherein the amphiphilic copolymer is of formula (I):

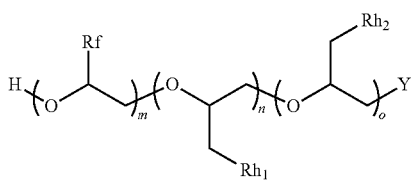

wherein the amphiphilic copolymer is a random or block copolymer, Rf is a perfluoro-substituted group, whereas $Rh_1$ and $Rh_2$ are hydrophilic groups or chlorine, m, n and o are independently from 0 to 1000, provided m+n+o is greater than or equal to 10, and Y is hydroxyl.

The required amount of a PTFE powder is mixed with a solution of the copolymer in a suitable solvent, for example, a ketone solvent such as acetone or methyl ethyl ketone to obtain a blend, which is then mixed with a lubricant such as odorless mineral spirits, e.g., Isopar G, and the resulting paste is subjected to shear, for example, in a twin roller, and formed into a billet under a pressure of about 300 psi or more, at least twice, each for a period of about 55 sec. The resulting billets are equilibrated at room temperature for about 12 hrs or more. The billets are then extruded into the desired shape. For example, extrusion is performed at 26 mm die gap size, maximum pressure and constant temperature of 55° C. resulting in a tube shaped PTFE tape. Next, the tube shaped tape is cut open along the central axis and re-rolled around a pipette, resulting in a new billet (non-compressed). The new billet is re-extruded at the same conditions as used during first extrusion process. This step is added to provide advantageous cross-directional mechanical properties to the PTFE tape. Calendaring is performed at 30° C. targeting a tape thickness of 9-10 mils and cut into 4×4". The resulting tape is then dried at 125° C. for 1 h, whereby the lubricant is removed from the extruded tape.

The tape is then stretched at the following conditions: Stretch ratio of machine direction (MD) and transverse direction (TD) is 3 at 300%/sec stretch rate. Temperature in the stretch oven is set to 150° C.

The stretched tape is then annealed. Annealing is conducted in the annealing oven at 350° C. for 5 sec, following which the tape is cooled. The porosity that is produced by the above stretching steps is retained upon cooling.

Optionally, the porous membrane obtained above is reacted with an acid to modify the chemical structure of the amphiphilic copolymer.

In accordance with an embodiment of the invention, the hydrophilic porous PTFE membrane is a porous membrane, e.g., a nanoporous membrane, for example, a membrane having pores of diameter between 1 nm and 100 nm, or a microporous membrane having pores of diameter between 1 µm and 10 µm.

The surface tension of the resulting porous membrane can be determined as follows. For example, a sheet of PTFE porous support is coated at room temperature by pre-wetting the membrane sheet with IPA solvent and soaking the membrane in a coating polymer solution with concentration that ranges between 0.1% and 10% by mass. The coating time ranges between (1 min to 12 hours). After soaking the support, it is dried in convection oven at 100° C. to 160° C. The drying time ranges between (10 minutes to 12 h). The resulting porous PTFE membrane's wetting characteristics are measured by measuring the critical wetting surface tension.

The change in surface modification in terms of surface tension was measured by measuring the critical wetting surface tension (CWST). The method relies on a set of solutions of certain composition. Each solution has specific surface tension. The solution's surface tension ranges from 25 to 92 dyne/cm in small non-equivalent increments. To measure the membrane surface tension, the membrane is positioned on to top of white light table, one drop of a solution of certain surface tension is applied to the membrane surface and the time the drop takes to penetrate through the membrane and become bright white as an indication of light going through the membrane is recorded. Instant wetting is considered when the time the drop takes to penetrate the membrane is ≤10 seconds. If the time >10 seconds, the solution is considered to partially wet the membrane.

Hydrophilic porous PTFE membranes according to embodiments of the invention can be used in a variety of applications, including, for example, diagnostic applications (including, for example, sample preparation and/or diagnostic lateral flow devices), ink jet applications, lithography, e.g., as replacement for HD/UHMW PE based media, filtering fluids for the pharmaceutical industry, metal removal, production of ultrapure water, treatment of industrial and surface waters, filtering fluids for medical applications (including for home and/or for patient use, e.g., intravenous applications, also including, for example, filtering biological fluids such as blood (e.g., virus removal)), filtering fluids for the electronics industry (e.g., filtering photoresist fluids in the microelectronics industry and hot SPM), filtering fluids for the food and beverage industry, beer filtration, clarification, filtering antibody- and/or protein-containing fluids, filtering nucleic acid-containing fluids, cell detection (including in situ), cell harvesting, and/or filtering cell culture fluids. Alternatively, or additionally, the porous membranes according to embodiments of the invention can be used to filter air and/or gas and/or can be used for venting applications (e.g., allowing air and/or gas, but not liquid, to pass therethrough). Porous membranes according to embodiments of the inventions can be used in a variety of devices, including surgical devices and products, such as, for example, ophthalmic surgical products.

In accordance with embodiments of the invention, the hydrophilic porous PTFE membrane can have a variety of configurations, including planar, flat sheet, pleated, tubular, spiral, and hollow fiber.

Hydrophilic porous PTFE membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive porous membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonate resin.

The present invention further provides a hydrophilically modified porous PTFE membrane produced by the method described above.

The present invention further provides a method of filtering a fluid, the method comprising passing the fluid through the hydrophilic porous PTFE membranes described above.

The following examples further illustrate the invention but, of course, should not be construed as in any way limiting its scope.

EXAMPLE 1

This example illustrates a method of preparing a hydrophilic porous PTFE membrane in accordance with an embodiment of the invention.

200 g of PTFE resin powder, FLUON CD123, was mixed with the desired amounts of the copolymer $(PF8PO)_{100}$-r-$(TBGE)_{200}$ in acetone solvent (25%) and Isopar G lubricant (50%) to obtain a blend containing 5% or 10% copolymer. The blend was mixed in a twin roller. The blend was formed into a billet by applying a pressure of 300 psi, at least twice, each for a period of about 55 sec. The resulting billets were equilibrated at room temperature for about 12 hrs. The billets were then extruded through a 26 mm die at the maximum pressure and constant temperature of 55° C., resulting in a tube-shaped PTFE tape. The tube-shaped tape was cut open along the central axis (along its length) and rolled around a pipette, resulting in a new billet (non-compressed). The new billet was extruded at the same conditions as used during the first extrusion process. Calendaring was performed at 30° C. targeting a tape thickness of 9-10 mils and cut into 4×4". The resulting tape was dried at 125° C. for 1 h, whereby the lubricant was removed from the tape. The tape was stretched in the machine direction and the transverse direction with a MD/TD ratio of 3 at a stretch rate of 300%/sec. The temperature of the stretch oven was set at 150° C. The resulting membrane was annealed in an annealing oven at 150° C. or 350° C. for various times as set forth in Table 2. The membrane performance characteristics are set forth in Table 2, and the results of exposure to formic acid (FA), sulfuric acid (SA), and trifluoroacetic acid (TFA) are set forth in Table 3.

TABLE 2

Membrane Preparation Conditions and CWST values

| Conditions - Stretch at 150° C. and anneal | CWST (Dyne/cm) | Comments |
|---|---|---|
| PEO copolymer 2 × 4 stretch hold at 150 C. for 30 sec | 37-39 | Sample appeared to dewet during WF testing |
| PEO copolymer 2 × 4 stretch hold for 250 C. for 30 sec | 33-35 | Sample appeared to dewet during WF testing |
| PEO copolymer 2 × 4 stretch hold at 350 C. for 30 sec | 30-33 | Sample appeared to dewet during WF testing |
| Standard PTFE | 25-27 | |

TABLE 3

Membrane Performance Characteristics

| | Thickness (mils) | IPA KL(psi) | Water Flow (L/min/ft2/psid) | CWST (Dynes/cm2) |
|---|---|---|---|---|
| Conditions | | | | |
| Sample A' 10 phr 2 × 4 stretch hold at 150° C. for 30 sec | 7.4 | 16 | 1.42 | 40-44 |
| Sample B' 10 phr 2 × 4 stretch hold at 250° C. for 30 sec | 6.9 | 18 | 1.95 | 35-37 |
| Sample C' 10 phr 2 × 4 stretch hold at 350° C. for 30 sec | 7.6 | 12 | 2.84 | 30-33 |
| Sample A 5 phr 2 × 4 stretch hold at 150° C. for 30 sec | 8 | 34 | 0.4 | 37-39 |
| Sample B 5 phr 2 × 4 stretch hold at 250° C. for 30 sec | 7.7 | 35 | 0.54 | 33-35 |
| Sample C 5 phr 2 × 4 stretch hold at 350° C. for 30 sec | 8 | 25 | 1.4 | 30-33 |
| Reference | | | | |
| Control 1 2 × 4 stretch hold at 150° C. for 30 sec | 7.4 | 25 | 0.73 | 25-27 |
| Control 2 2 × 4 stretch hold at 250° C. for 30 sec | 7.5 | 22 | 1.06 | 25-27 |
| Control 3 2 × 4 stretch hold at 350° C. for 30 sec | 7 | 16 | 2.22 | 25-27 |

TABLE 4

Results of Reaction with Acids

| Percentage of amphiphilic copolymer | Sample | CWST On as stretched | CWST after 30 min IPA soak | Post Modification in FA, SA, TFA |
|---|---|---|---|---|
| 5 phr | 150° C. for 30 sec | 37-40 | 37-40 | — |
| | 250° C. for 30 sec | 33-35 | 33-35 | 30-33 |
| | 350° C. for 30 sec | 30-33 | 30-33 | 30-33 |
| 10 phr | 150° C. for 30 sec | 40-44 | 40-44 | |
| | 250° C. for 30 sec | 35-37 | 35-37 | |
| | 350° C. for 30 sec | 30-33 | 30-33 | |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A hydrophilic porous membrane comprising polytetrafluoroethylene (PTFE) and an amphiphilic copolymer of formula (I):

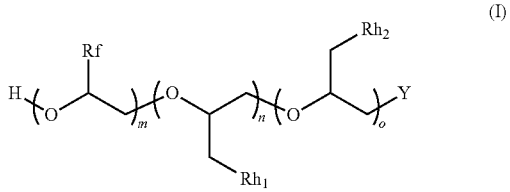

wherein the amphiphilic copolymer is a random or block copolymer, Rf is a perfluoro-substituted group, whereas $Rh_1$ and $Rh_2$ are selected from hydroxyl and trifluoroacetyl, m, n, and o are independently from 0 to 1000, provided m+n+o is greater than or equal to 10, and Y is hydroxyl.

2. The hydrophilic porous membrane of claim 1, wherein Rf is perfluoro-substituted alkyl, where alkyl chain may optionally contain one or more oxygen atoms in the chain.

3. The hydrophilic porous membrane of claim 1, wherein Rf is $C_pF_{2p+1}$—$(CH_2)_q$ $(OCH_2)_r$, wherein p is 1 to 12, q is 0 to 3, and r is 0 to 2.

4. The hydrophilic porous membrane of claim 3, wherein Rf is independently selected from $C_8F_{17}CH_2$, $C_6F_{13}(CH_2)_2OCH_2$, $C_4F_9CH_2$ and $CF_3$.

5. The hydrophilic porous membrane of claim 4, wherein Rf is selected from $C_8F_{17}CH_2$ and $C_6F_{13}(CH_2)_2OCH_2$.

6. A method of preparing a hydrophilic porous membrane according to claim 1, comprising:
   (i) preparing a blend comprising PTFE and the amphiphilic copolymer, and optionally a lubricant;
   (ii) extruding the blend into a tape;
   (iii) biaxially stretching the tape to obtain a porous membrane;
   (iv) reacting the porous membrane with an agent to obtain the hydrophilic porous membrane; and optionally
   (v) annealing the hydrophilic porous membrane.

7. A method of filtering a fluid, the method comprising passing the fluid through the hydrophilic porous membrane of claim 1.

8. The hydrophilic porous membrane of claim 1, wherein $Rh_1$ and $Rh_2$ are hydroxyl.

9. The hydrophilic porous membrane of claim 1, wherein m and n are independently from about 10 to about 1000, o is 0, and $Rh_1$ is hydroxyl.

10. The hydrophilic porous membrane of claim 9, wherein m and n are independently from about 100 to about 200 and o is 0.

* * * * *